United States Patent [19]

Terui et al.

[11] Patent Number: 5,253,057
[45] Date of Patent: Oct. 12, 1993

[54] MULTIPLEXED TRANSMISSION SYSTEM OF IMAGE DATA FROM TWO OR MORE SOURCES WHEREIN THINNING RATES ARE ADAPTIVELY ALLOCATED TO RESPECTIVE SOURCES

[75] Inventors: Yuichi Terui; Mitunori Ono; Toshihiro Yamanaka; Kenji Rikimaru, all of Kawasaki, Japan

[73] Assignee: Fujitsu Limited, Kawasaki, Japan

[21] Appl. No.: 811,363

[22] Filed: Dec. 20, 1991

[30] Foreign Application Priority Data

Dec. 20, 1990 [JP] Japan .................................. 2-411922

[51] Int. Cl.$^5$ .......................... H04N 7/18; H04N 7/13
[52] U.S. Cl. ..................................... 358/136; 358/108
[58] Field of Search ................. 358/136, 108, 85, 135, 358/105, 142

[56] References Cited

U.S. PATENT DOCUMENTS

| | | | |
|---|---|---|---|
| 4,337,481 | 6/1982 | Mick et al. | 358/136 X |
| 4,485,402 | 11/1984 | Searby | 358/136 X |
| 4,673,974 | 6/1987 | Ito et al. | 358/108 |
| 4,710,813 | 12/1987 | Wallis et al. | 358/136 |
| 4,827,336 | 5/1989 | Acampora et al. | 358/136 X |

FOREIGN PATENT DOCUMENTS 238389  9/1989  Japan .

OTHER PUBLICATIONS

Patent Abstracts of Japan, Kokai No. 1-239389, Sep. 22, 1989, p. 91 E862.

Primary Examiner—Victor R. Kostak
Attorney, Agent, or Firm—Staas & Halsey

[57] ABSTRACT

A transmission system is provided having a sender side apparatus, a receiver side apparatus, and a transmission line connecting the sender and receiver side apparatuses. The sender side apparatus provides a selector for receiving image data signals of a plurality of channels in parallel and, frame by frame, selects an image data signal of one of the plurality of channels for each frame. The selector discards the image data signals of the other of the plurality of channels. A coding unit codes the image data signal which is selected for each frame by the selector, by interframe difference coding. A monitoring unit monitor data amounts of interframe differences in the image data signals of the respective channels. A control unit determines which one of said plurality of channels is to be selected by the selector, based on the data amounts of interframe differences in the image data signals of the respective channels, and adaptively controls the selector in accordance with this determination. Channel information is generated indicating the above one of the channels determined by the control unit for each frame. Frame by frame, the image data signal coded by the above coding means is transmitted, together with the above channel information corresponding to the coded image data signal. The receiver side apparatus receives the transmitted image data signal, together with the channel information, and a unit for decodes the received image data signal for each frame.

17 Claims, 14 Drawing Sheets

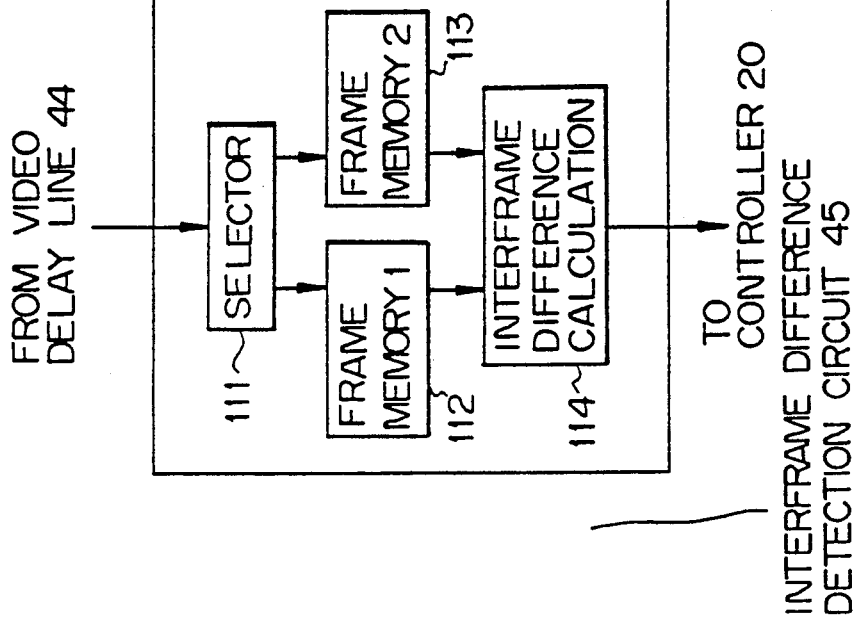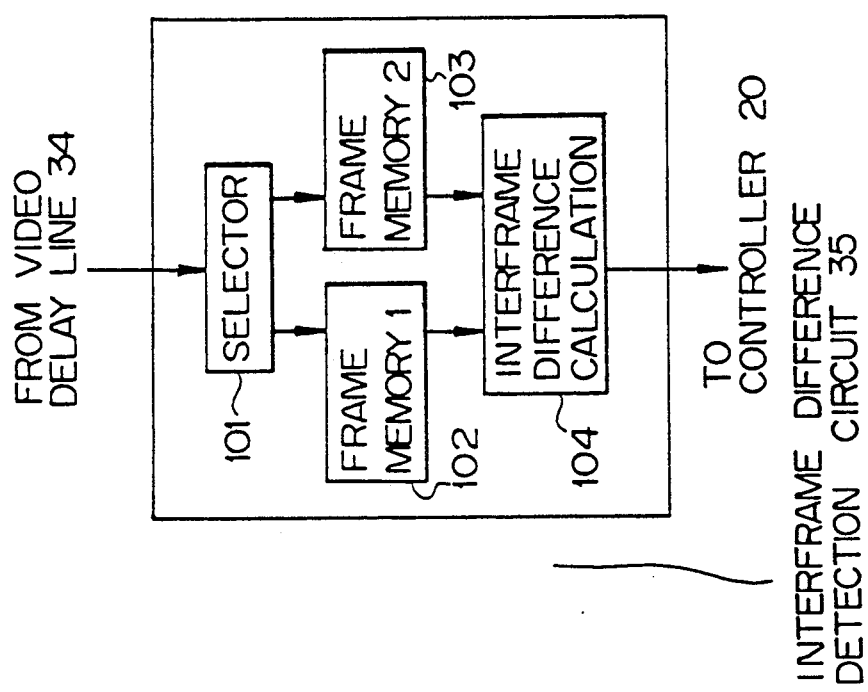

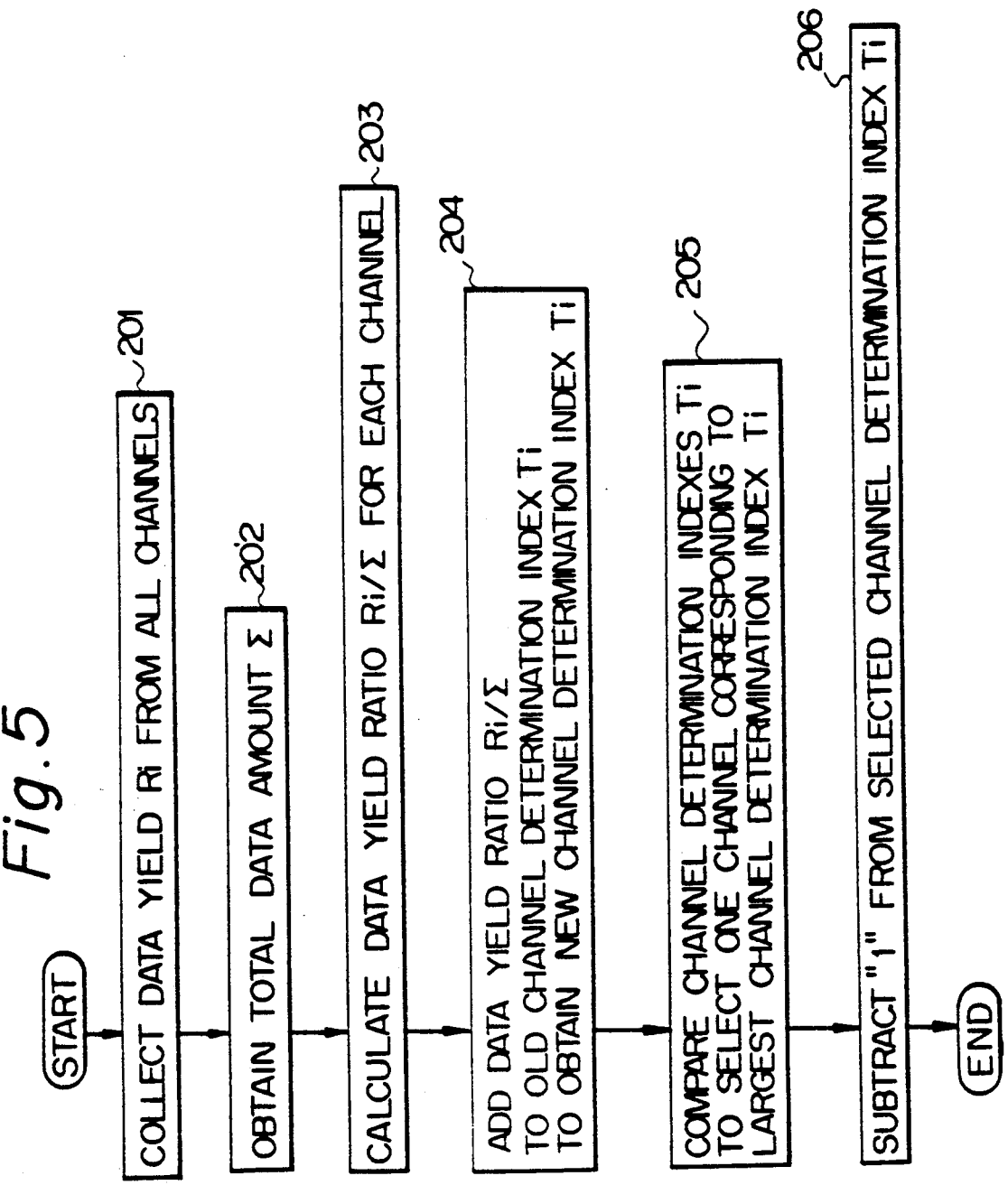

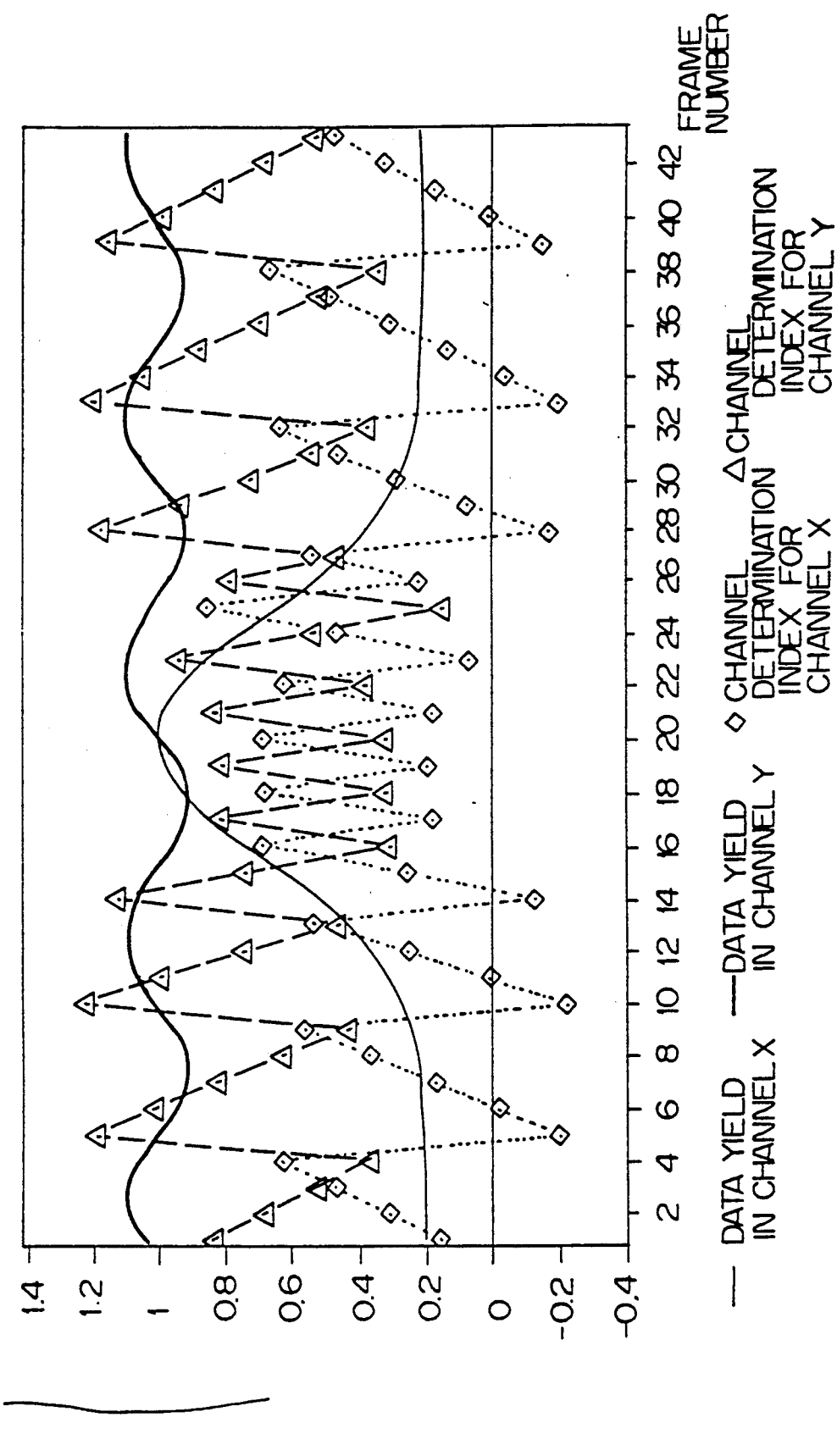

MULTIPLEXED TRANSMISSION SYSTEM OF IMAGE DATA FROM TWO OR MORE SOURCES WHEREIN THINNING RATES ARE ADAPTIVELY ALLOCATED TO RESPECTIVE SOURCES

BACKGROUND OF THE INVENTION

(1) Field of the Invention

The present invention relates to a transmission system of image data from a plurality of sources wherein the image data from the plurality of sources are respectively thinned to limit a total transmission rate before transmitting the image data.

The present invention can be applied to a television conference system having a plurality of television cameras in each conference room, or security service system for monitoring a plurality of scenes taken by a plurality of television cameras, by displaying the respective scenes in turn on one television monitor

(2) Description of the Related Art

In a television conference, image data obtained in two or more conference rooms are transmitted therebetween. In recent television conference systems, image data are obtained by a plurality of television cameras in each conference room, are multiplexed in a television conference terminal apparatus provided in each conference room, and are then transmitted through a transmission line having a constant transmission rate, to the other conference rooms. Although, generally, signals from the plurality of conference rooms, respectively indicating image data, are coded to reduce the transmission rates of the respective signals, it is further required to thin the respective image data frames by discarding a part of successive image frames in each of the image data signals from the plurality of sources.

Conventionally, the above thinning (discarding) is carried out at constant rates for the respectively image data signals. Namely, constant transmission rates are allocated to the respective image data signals.

However, a maximum allowable rate of the above thinning (discarding) for maintaining a minimum required quality of a moving image (i.e., a quality of a moving image after thinned, coded, transmitted, and then decoded on a receiver side) regarding smoothness of movement of an object in the image—varies with time, depending upon a degree of movement of an object in the image from each source (television camera). Therefore, according to the above conventional technique wherein the constant thinning (discarding) rates are allocated to the respective image data from the plurality of television cameras, the quality of the moving image may fall below the above minimum quality when the degree of the movement becomes high. Conventionally, to prevent such a problem, the above thinning (discarding) rates allocated to the respective image data signals must be limited to low rates. However, since a total transmission rate of each transmission line connecting the plurality of conference rooms is predetermined, the decrease in the above thinning rates forces the coder to decrease the output bit rate thereof. Namely, in this case, the quality of the image is reduced by the decrease in the output bit rate of the coder.

SUMMARY OF THE INVENTION

An object of the present invention is to provide a transmission system of image data from a plurality of channels wherein the image data from the plurality of channels are respectively thinned to limit a total transmission rate wherein numbers of frames allocated to the respective channels are adaptively varied in response to variations of degrees of movement of images in the respective channels so that quality of a moving image of each channel is maintained.

According to the present invention, there is provided a transmission system comprising a sender side apparatus, a receiver side apparatus, and a transmission line connecting the sender side apparatus and the receiver side apparatus. The sender side apparatus comprises: a selector for receiving a plurality of channels of image data signals, selecting one of the plurality of channels of image data signals as an output thereof, and discarding the other plurality of channels of image data signals; an interframe coding unit for coding the image data signal selected by the selector by interframe coding; an interframe difference monitoring unit for monitoring amounts of interframe differences in the respective channels of image data signals; a selection channel control unit for determining which one of the plurality of channels of image data signals is to be selected as the output of the selector, based on the above amounts of interframe differences in the respective channels of image data signals, and adaptively controlling the selector in accordance with the determination thereby; a selected channel information generating unit for generating channel information indicating the above one of the channels which is determined by the selection channel control unit; and a transmitting unit for transmitting the image data signal coded by the interframe coding unit, together with the channel information corresponding to the coded image data signal. The receiver side apparatus comprises: a receiving unit for receiving the image data signal transmitted from the sender side apparatus, together with the channel information corresponding to the image data signal; a decoding unit for decoding the image data signal received by the receiving unit, and a delivering unit for adaptively delivering the image data signal decoded by the decoding unit, as an image data signal of the channel indicated in the channel information received with the image data signal.

BRIEF DESCRIPTION OF THE DRAWINGS

In the drawings:

FIGS. 4A and 4B are diagrams respectively indicating constructions of the interframe difference detection circuits 35 and 45;

FIG. 5 is a flowchart indicating an operation of the controller 20 for controlling the selector 37 in FIG. 3;

FIG. 6 indicates an example relationship between the data yield ratio Ri, the channel determination index Ti, and the determined channel when the number of channels is two and the data yield ratio Ri for the two channels respectively vary;

DESCRIPTION OF THE PREFERRED EMBODIMENTS

Figure 1:
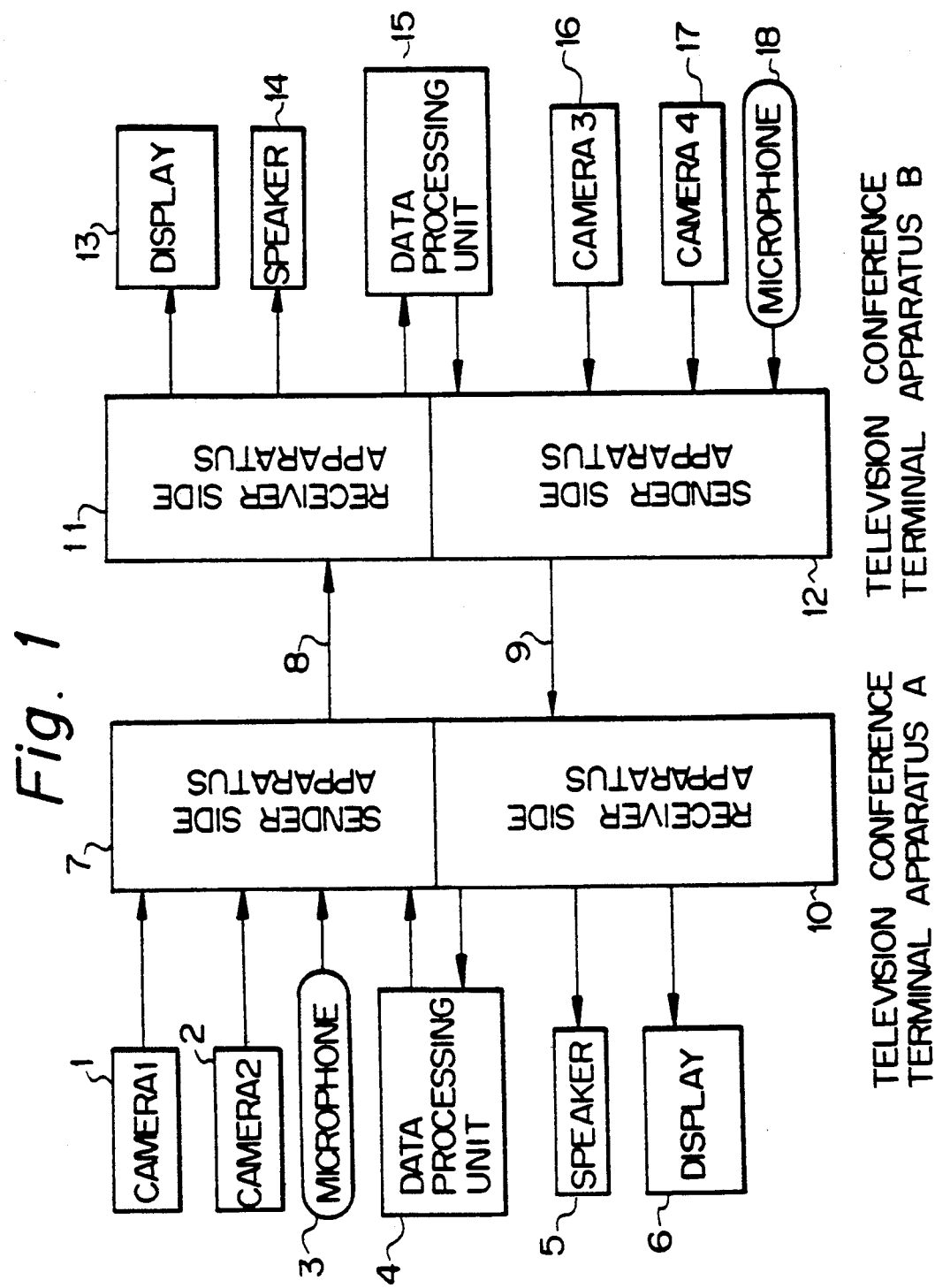
FIG. 1 is a diagram indicating a simple example construction of a television conference system to which the present invention can be applied.

Television Conference System (FIG. 1)

FIG. 1 is a diagram indicating a simple example construction of a television conference system to which the present invention can be applied. In the construction of FIG. 1, television conference terminal apparatuses A and B are connected by transmission lines 8 and 9. The television conference terminal apparatus A comprises two (or more) television cameras 1, 2, (at least) one microphone 3, a data processing unit 4, a sender side apparatus 7, a receiver side apparatus 10, a speaker 5, and a display apparatus 6. The television conference terminal apparatus B has a construction similar to the television conference terminal apparatus A, as shown in FIG. 1. An analog image (video) signal, for example, an NTSC signal, is generated in each of the television cameras 1 and 2. The analog image (video) signal is then supplied to the sender side apparatus 7, together with a voice signal generated in the microphone 3 and a digital data signal generated in the data processing unit 4. The analog image signals from the television cameras 1 and 2 and the voice signal from the microphone 3 are respectively converted to digital signals and coded in the sender side apparatus 7, and the coded digitals and the data signal from the data processing unit 4 are multiplexed to be transmitted through the transmission line 8 to the receiver side apparatus 11 in the television conference terminal apparatus B. The transmitted signal is demultiplexed to two coded image data signals, a coded voice signal, and a digital data signal in the receiver side apparatus 11. The digital data signal is supplied to the data processing apparatus 15 in the television conference terminal apparatus 11, and the above two coded image data signals and the coded voice signal are respectively decoded in the receiver side apparatus 11. The decoded image data signals are processed to generate an image data to be displayed in the display unit 13, and the decoded voice signal is converted to an analog voice signal to drive the speaker 14.

For example, the above two image data signals may respectively represent: an image zooming in on a speaking person in each conference room and a background scene of the conference room or an image of one member of the television conference in a conference room and an image of another member in the conference room. The two image data signals may be processed in the receiver side apparatus 11 to display a synthesized image of the above two images, or alternatively display the two images.

Figure 2:
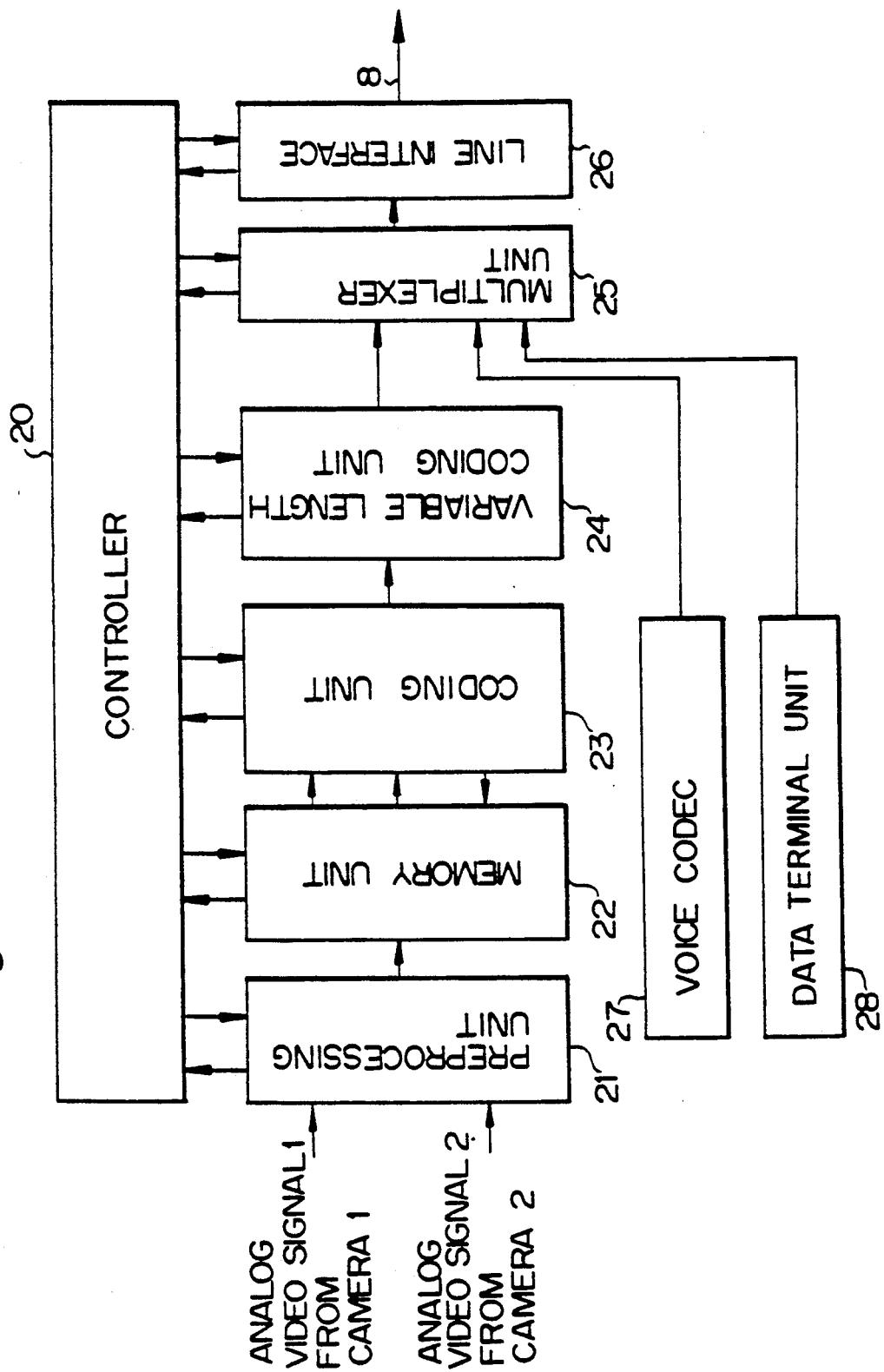
FIG. 2 is a diagram indicating a construction of the sender side apparatus 7 (or 12) in FIG. 1.

Sender Side Apparatus (FIG. 2)

FIG. 2 is a diagram indicating a construction of the sender side apparatus 7 (or 12) in FIG. 1. In FIG. 2, reference numeral 20 denotes a controller, 21 denotes a preprocessing unit, 22 denotes a memory unit, 24 denotes a variable length coding unit, 25 denotes a multiplexer/demultiplexer unit, 26 denotes a line interface, 27 denotes a voice CODEC, and 28 denotes a data processing unit. The above-mentioned video signals from the television cameras 1 and 2 are processed through the preprocessing unit 21, the memory unit 22, the coding unit 23, and the variable length coding unit 24, as explained later in detail. The above-mentioned voice signal from the microphone 3 is converted to a digital signal, and is then coded to generate a coded digital voice signal. The data processing apparatus 28 is provided to transmit digital data parallel to the transmission of the above image data signals and the voice signal. The above processed image data signal output from the variable length coding unit 24, the coded digital voice signal from the voice CODEC 27, and the digital data signal from the data processing unit 28, are multiplexed in the multiplexer/demultiplexer unit 25, and are then transmitted through the line interface circuit 26 onto the transmission line 8. The controller 20 controls all the above elements in FIG. 2.

Figure 3:
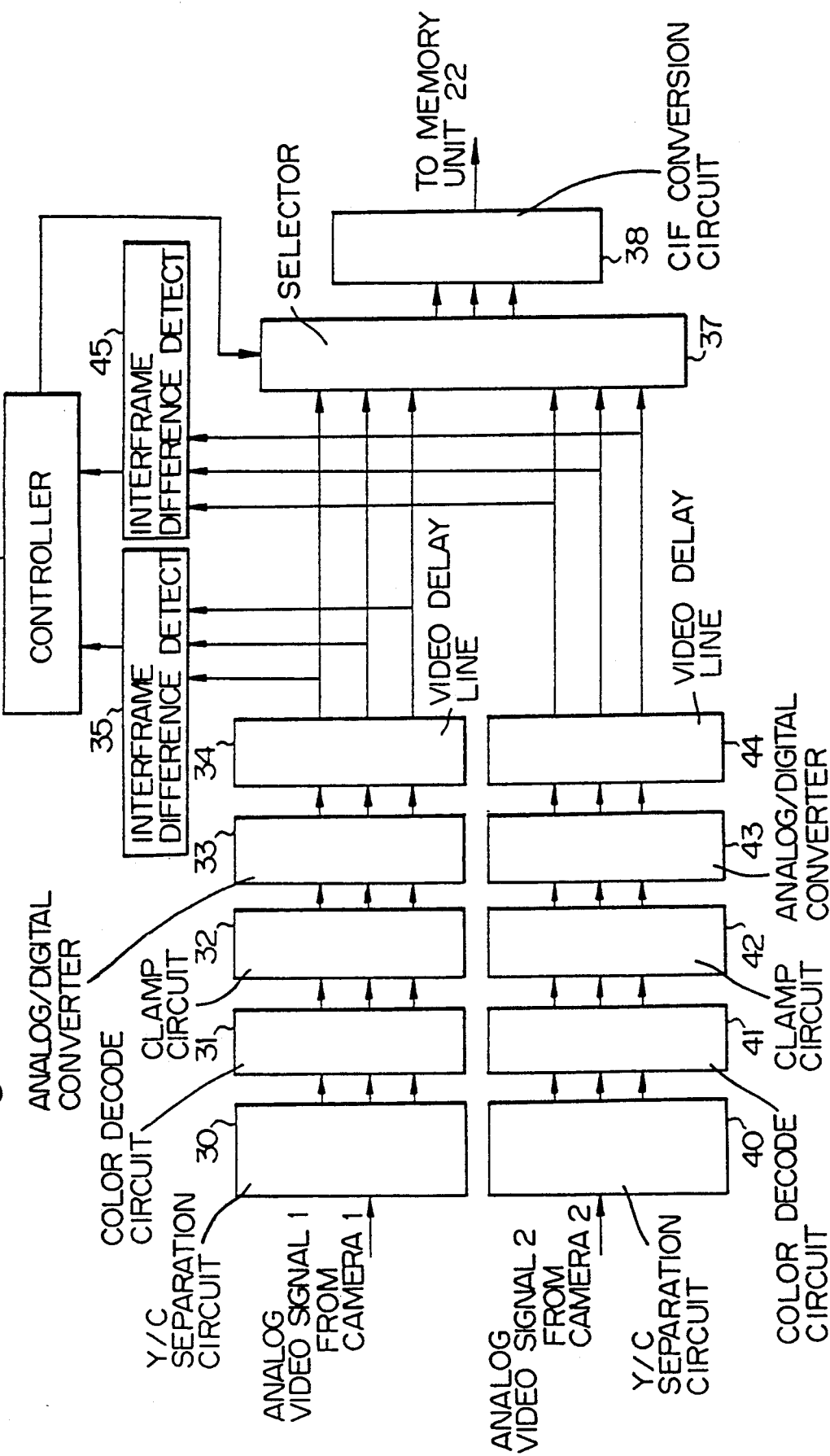
FIG. 3 is a diagram indicating the preprocessing unit 21 in FIG. 2.

Preprocessing Unit 21 (FIG. 3)

FIG. 3 is a diagram indicating the preprocessing unit 21 in FIG. 2. In FIG. 2, reference numeral 30 and 40 each denote a Y/C separation circuit, 31 and 41 each denote a color decode circuit, 32 and 42 each denote a clamp circuit, 33 and 43 each denote an analog/digital converter, 34 and 44 each denote a video delay line, 35 and 45 each denote an interframe difference detection circuit, 37 denotes a selector, and 38 denotes an NTSC/CIF conversion circuit.

The analog video signal from the television camera 1 is separated to a luminance signal Y and a color signal C in the Y/C separation circuit 30, and then these signals are converted to R, G, and B signals in the color decode circuit 31. The R, G, and B signals are respectively clamped to a pedestal level in the clamp circuit 32, and are then converted to digital signals, respectively, in the analog/digital converter 33. The outputs of the analog/digital converter 33, i.e., image data signals corresponding to the R, G, and B signals, are supplied through the video delay line 34 to the selector 37. Parallel to the above, the analog video signal from the television camera 2 is processed through the Y/C separation circuit 40, the color decode circuit 41, the clamp circuit 42, the analog/digital converter 43, and the video delay line 44, to be supplied to the selector 37.

The above outputs of the video delay lines 34 are monitored by the interframe difference detection circuit 35, and the outputs of the video delay lines 44 are monitored by the interframe difference detection circuit 45. The interframe difference detection circuit 35 is provided to obtain a yield of interframe difference data between each frame and another frame preceding each frame output from the video delay line 34, and the interframe difference detection circuit 45 is provided to obtain a yield of interframe difference data between each frame and another frame preceding each frame output from the video delay line 44, as explained later. Namely, interframe difference detection circuits 35 and 45 detect degrees of movement in the images taken by the television cameras 1 and 2, respectively. The outputs of the interframe difference detection circuits 35 and 45 are supplied to the controller 20 in FIG. 2.

The selector 37 receives the above two sets of output signals respectively corresponding to the R, G, and B signals from the video delay lines 34 and 44, and selects one of the two sets as a set of output signals thereof, under control of the controller 20, to be supplied to the NTSC/CIF conversion circuit 38. The NTSC/CIF conversion circuit 38 converts the NTSC signal to a corresponding CIF (Common Interface) signal.

Interframe Difference Detection Circuit (FIGS. 4A and 4B)

FIGS. 4A and 4B are diagrams respectively indicating constructions of the interframe difference detection circuits 35 and 45. In FIG. 4A, reference numeral 101 denotes a selector, 102 and 103 each denote a frame memory, and 104 denotes an interframe difference calculation circuit. The selector 101 receives the above-mentioned outputs of the video delay line 34, and alternatively delivers the received signals to the frame memories 102 and 103 frame by frame. Namely, after image data of one frame is stored in one of the frame memories 102 and 103, image data of the next frame is stored in the other frame memories. The interframe difference calculation circuit 104 reads the image data of all pixels of a frame and another frame preceding each frame from the frame memories 102 and 103, and calculates the sum of interframe differences for all pixels between each frame and a frame preceding the frame, to supply the sum to the controller 20 in FIG. 2.

The interframe difference detection circuit 45 in FIG. 4B operates in a way similar to the interframe difference detection circuit 35 in FIG. 4A.

Control of Selector 37 (FIG. 5)

FIG. 5 is a flowchart indicating an operation of the controller 20 for controlling the selector 37 in FIG. 3. Although the selector 37 in FIG. 3 receives two channels of image data corresponding to the television cameras 1 and 2, the present invention can be applied to general cases wherein the selector 37 receives a plurality (N) of channels of image data. Therefore, the operation of the controller 20 for controlling the selector 37 is explained for such a general case as below. In such a case, the interframe difference detection circuits must be provided corresponding to the reception of the plurality of channels of image data.

In FIG. 5, in step 201, the controller 20 collects the above yields Ri (i=1 to N) of interframe difference data from all the above interframe difference detection circuits. In step 202, a sum S of the above yields Ri (i=1 to N) of interframe difference data of all the channels is obtained, and then the data yield ratio Ri/S is obtained by dividing the above yields Ri (i=1 to N) of interframe difference data by the above sum S for each channel, in step 203. Then, in step 204, the above data yield ratio Ri/S for each channel is added to a channel determination index Ti for the channel. The channel determination index Ti for the channel is renewed by the added result. The channel determination indexes Ti (i=1 to N) for all the channels are initially set to zero. Next, in step 205, one of the channels corresponding to a largest value of the channel determination index Ti is determined by comparing all the values of the channel determination indexes Ti (i=1 to N). Thus, the controller 20 controls the selector 37 to select the image data signals of the above determined channel. Then, in step 206, the value of the channel determination index Ti for the above selected channel, is decreased by one. The above steps 201 to 206 are carried out when every new frame data is stored in either of the two frame memories (for example, 102 or 103 in the interframe difference detection circuit 35) in the interframe difference detection circuits for all the channels. Further, the controller 20 memorizes the above selection result for every frame output from the selector 37 to carry out control operations in the following stages in the sender side apparatus.

Table 1 indicates an example relationship between the data yield ratio Ri, the channel determination index Ti, and the determined channel when the number of channels is two, the data yield ratio Ri for one channel is constantly equal to ⅓, and the data yield ratio Ri for the other channel is constantly equal to 2/3. Table 2 indicates an example relationship between the data yield ratio Ri, the channel determination index Ti, and the determined channel when the number of channels is three, the data yield ratio Ri for channel X is constantly equal to 1/6, the data yield ratio Ri for channel Y is constantly equal to ⅓, and the data yield ratio Ri for channel Z is constantly equal to ½. Further, FIG. 6 indicates an example relationship between the data yield ratio Ri, the channel determination index Ti, and the determined channel when the number of channels is two and the data yield ratio Ri for the two channels respectively vary.

Figure 7:
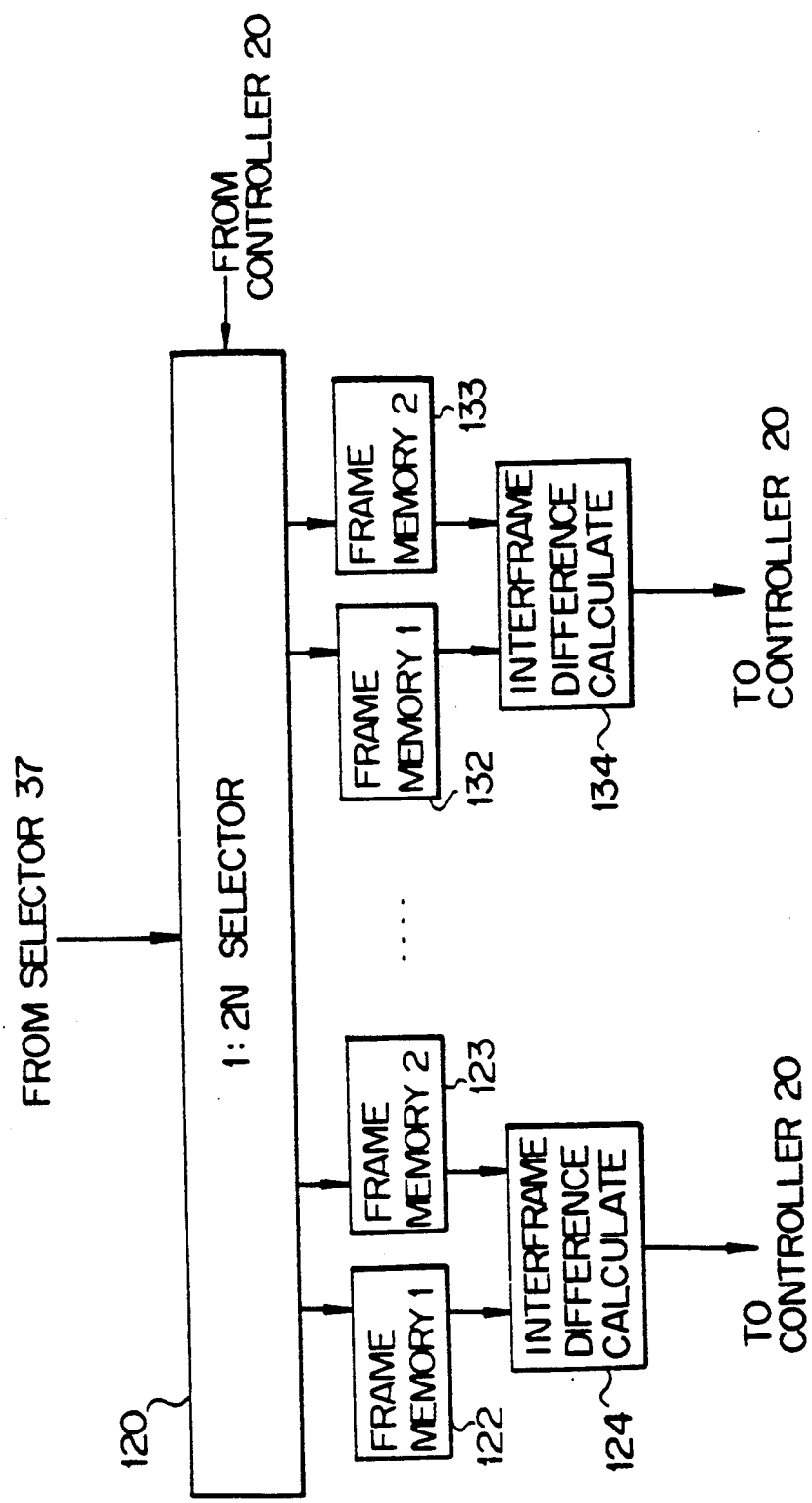
FIG. 7 is a diagram indicating another construction for detecting the interframe differences in a plurality of channels.

Another Interframe Difference Detection Circuit (FIG. 7)

FIG. 7 is a diagram indicating another construction for detecting the interframe differences in a plurality of channels. Although, in the construction of FIG. 3, the yields of the interframe difference data are monitored on the input side of the selector 37, the output signals of the selector 37 are monitored by the construction of FIG. 7.

In FIG. 7, reference numeral 120 denotes a 1:2N selector, 122, 123, 132, and 133 each denote a frame memory, and 124 and 134 each denote an interframe difference calculation circuit.

The 1:2N selector 120 has one input port (containing three bits corresponding to the R, G, and B signals) and 2N ports, where N is the number of the channels. Each combination of two frame memories and an interframe difference detection circuit (for example, the two frame memories 122 and 123 and the interframe difference detection circuit 124) correspond to one of the plurality of channels. The selector 120 is controlled by the controller 20 so that the selector 120 delivers the output signals of the selector 37 to one of the above combination (of two frame memories and an interframe difference detection circuit) corresponding to the channel selected in the selector 37. The function similar to that of the selector 101 or 111 in FIGS. 4A and 4B is included in the function of the selector 120. Namely, the above output signals of the selector 120 are respectively supplied to and stored in the two frame memories (for example, 122 or 123) frame by frame when each combination is selected by the selector 120. The interframe difference calculation circuits 124 and 134 operates in a way similar to the interframe difference calculation circuits 104 and 114 in FIGS. 4A and 4B except that each of the interframe difference calculation circuits 124 and 134 in FIG. 7 operates only when the output signals of the selector 120 is delivered to either of the frame memories in the combination which the interframe difference calculation circuit belongs to.

In this case, the controller 20 in the sending side apparatus determines the channel to be selected in the selector 37 based on the yields of interframe difference data calculated in the interframe difference calculation circuits 124 and 134 of all the channels. The determination may be carried out in accordance with the operation of FIG. 5.

Otherwise, a plurality of patterns of the channel selection sequences may be provided in the controller 20 in advance, and the selections in successive frame cycles in the selector 37 are carried out in accordance with one of the plurality of patterns. For example, the pattern "YXY" may be used when the number of channels is two, the data yield ratio Ri for one channel is constantly equal to ⅓, and the data yield ratio Ri for the other channel is constantly equal to ⅔, and the pattern "ZYXZYZ" may be used when the number of channels is three, the data yield ratio Ri for channel X is constantly equal to 1/6, the data yield ratio Ri for channel Y is constantly equal to ⅓, and the data yield ratio Ri for channel Z is constantly equal to ½. The pattern to be used for the successive selections may be determined by using the operation of FIG. 5. In this case, the operation of FIG. 5 is carried out for each of the above predetermined numbers of frame cycles.

Although the operation for determining the selection pattern is carried out for the above predetermined numbers of frame cycles, the degree of movement in the respective images corresponding to the plurality of channels may greatly vary while using a determined pattern in each of the predetermined number of frame cycles. Taking the variation of the degree of movement in the respective images into consideration, a difference between two successively obtained data yields (for example, sums) of interframe differences may be detected for each channel. Although not shown, to detect the difference between two successively obtained data yields of interframe differences, a register for temporarily storing a data yield (for example, a sum) of interframe differences, and a calculation circuit for calculating the difference between two successively obtained data yields of interframe differences, in a stage following each of the interframe difference calculation circuits 124 and 134 in FIG. 7. For example, when the difference between two successively obtained data yields of interframe differences exceeds a predetermined amount, the controller 20 may carry out the operation of FIG. 5 to immediately renew the selection pattern.

Figure 8:
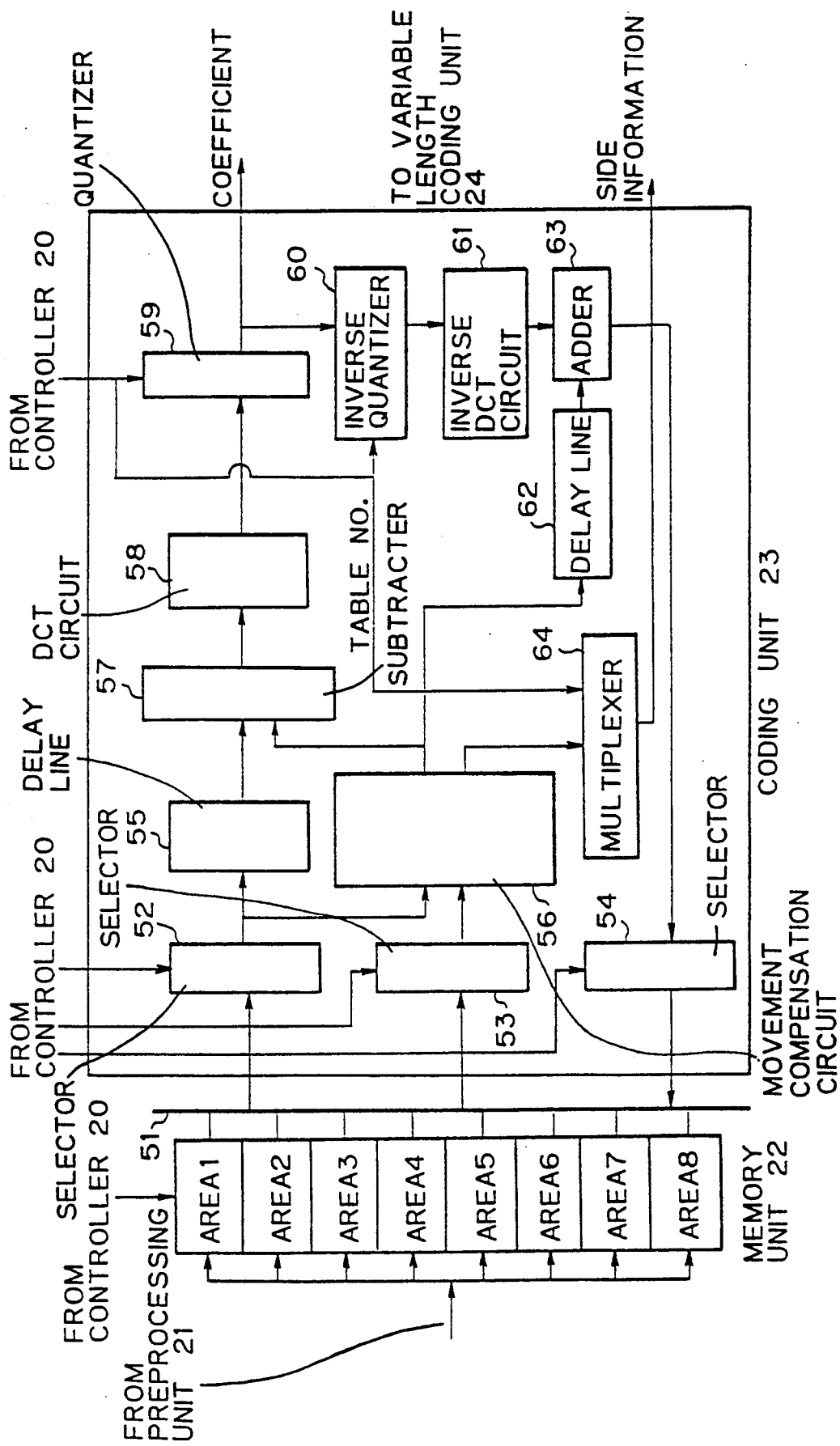
FIG. 8 is a diagram indicating constructions of the memory unit 22 and the coding unit 23.

Memory unit 22 and Coding unit 23 (FIG. 8)

FIG. 8 is a diagram indicating construction of the memory unit 22 and the coding unit 23. In FIG. 8, reference numeral 51 denotes a bus, 52, 53, and 54 each denote a selector, 55 and 62 each denote a delay line, 56 denotes a movement compensation circuit, 57 denotes a subtracter, 58 denotes a DCT circuit, 59 denotes a quantizer, 60 denotes an inverse quantizer, 61 denotes an inverse DCT circuit, 63 denotes an adder, 64 denotes a multiplexer.

The memory unit 22 contains a plurality of (eight) areas, and each of the plurality of areas temporarily stores image data of a frame. Each area of the memory unit 22 has one bit data input/output port.

The NTSC/CIF conversion circuit 38 has a serial output port to output serial image data (CIF) signal, and the output port of the NTSC/CIF conversion circuit 38 is connected with the data input/output ports of the eight areas of the memory unit 22. Thus, the image data (CIF) signal is output from the NTSC/CIF conversion circuit 38 at a constant rate (30 frames/sec) to be applied to the eight areas of the memory unit 22. The controller 20 supplies an address signal and control signals to store the image data output from the NTSC/CIF conversion circuit 38, in the memory unit 22. As mentioned above, image data of successive frames are respectively stored in the plurality of areas of the memory unit 22 frame by frame under control of the controller 20.

The coding unit 23 compresses the image data by interframe coding with discrete cosine transforming and movement compensation. The image data stored in the respective areas are supplied in turn to the coding unit 23 block by block through the bus 51 and the selector 52 under the control of the controller 20. The areas of the memory unit 22 are also used as a frame memory of the coding unit 23. Therefore, image data is written through the selector 54 in the memory unit 22, and is read through the selector 53 from the memory unit 22 under control of the controller 20.

The selector 52 has eight input ports and an output port. The eight input ports of the selector 52 are respectively connected with the data input/output ports of the eight areas of the memory unit 22 through the bus 51. The selector 52 is controlled by the controller 20 to supply an output of one of the areas of the memory unit 22 to the delay line 55 and the movement compensation circuit 56. Similarly, the selector 53 has eight input ports and an output port. The eight input ports of the selector 53 are respectively connected with the data input/output ports of the eight areas of the memory unit 22 through the bus 51. The selector 53 is controlled by the controller 20 to supply an output of one of the areas of the memory unit 22 to the movement compensation circuit 56.

In addition, selector 54 has one input port and eight output ports. The eight output ports of the selector 54 are respectively connected with the data input/output ports of the eight areas of the memory unit 22 through the bus 51. The selector 54 is controlled by the controller 20 to supply an output of the adder 63 to one of the areas of the memory unit 22.

Thus, the image data of each frame which is output from the NTSC/CIF conversion circuit 38, is once stored in one of the areas of the memory unit 22, and is then read out therefrom to be supplied to the subtracter 57 through the delay line 55, and to the movement compensation circuit 56. Parallel to the above operation, image data in a preceding frame once coded, regenerated in the coding unit 23, and stored in another of the areas of the memory unit 22, is read out therefrom through the selector 53 to be supplied to the movement compensation circuit 56. The movement compensation circuit 56 receives the image data of the above two successive frames, detects information on movement of an object in images between the preceding frame and the following frame, and outputs the information (movement information) and a modified image data generated by modifying the image data in the above preceding frame with the detected movement information. The detected modified information is supplied to the multiplexer 64, and the modified image data is supplied directly to the subtracter 57 and the adder 63 through the delay line 62. The subtracter 57 obtains a difference (interframe difference) between the image data supplied through the selector 52, and the above modified image data from the movement compensation circuit 56. The interframe difference data is supplied to the DCT circuit 58 to be transformed by discrete cosine transformation. The transformed image data output from the DCT circuit 58, is supplied to the quantizer 59 to be quantized thereby. The quantizer 59 contains a plurality of quantization tables where the quantization of the image data is carried out referring to one of the quantization tables, and the number of output bits of the quantizer 59 varies depending on the quantization table. The quantization table to be referred to is selected in accordance with a control signal supplied from the controller 20. The quantized image data is output from the quantizer 59 as a coefficient output of the coding unit 23.

To regenerate the image data before the coding, to be stored in the frame memory, the output of the quantizer 59 is inversely quantized (interpolated) by the inverse quantizer 60. The inverse quantizer 60 also contains the same quantization tables as the quantizer 59, and the same quantization table as the quantizer 59 is selected in accordance with the above control signal supplied from the controller 20. The output of the inverse quantizer 60 is then supplied to the inverse DCT circuit 61 to be inversely transformed (decoded) by the inverse discrete cosine transformation. The output of the inverse DCT circuit 61 is supplied to the adder 63. The adder 63 adds the output of the inverse DCT circuit 61, to the above modified image data received through the delay line 62 from the movement compensation circuit 56. The added image data is supplied through the selector 54 to one of the areas of the memory unit 22, to be stored as the above-mentioned regenerated image data of the preceding frame. The multiplexer 64 receives the above movement information from the movement compensation circuit 56 and information on the selected quantization table in the quantizer 59 and the inverse quantizer 60, and multiplexes the received information as side information to be output to the variable length coding unit 24, together with the above coefficient. In the construction of FIG. 8, the multiplexer 64 receives the above control signal from the controller 20 to control the quantizer 59 and the inverse quantizer 60 to select the quantization table, as the above information on the selected quantization table.

During the above operation, the controller 20 memorizes which frame data is stored in which area of the memory unit 22, together with the above-mentioned memorization of the selection results in the selector 37. In addition, since the controller 20 controls the memory unit 22 and the coding unit 23, the controller 20 recognizes the timing in which the coded result of image data of each frame is output from the coding unit 23.

Figure 9:
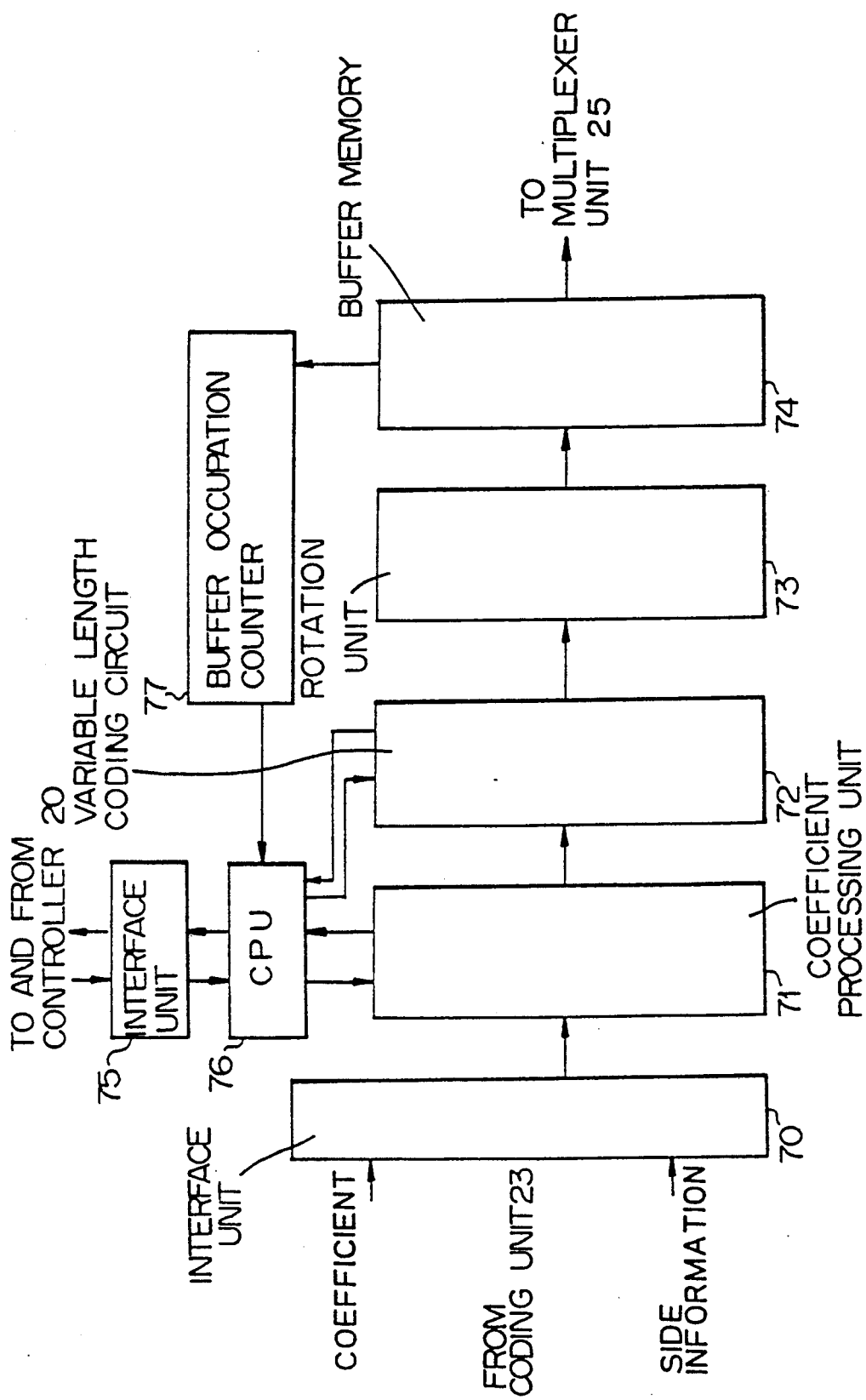
FIG. 9 is a diagram indicating a construction of the variable length coding unit 24.

Variable length Coding unit 24 (FIG. 9)

FIG. 9 is a diagram indicating a construction of the variable length coding unit 24. In FIG. 9, reference numeral 70 denotes an interface unit, 71 denotes a coefficient processing unit, 72 denotes a variable length coding circuit, 73 denotes a rotation circuit, 74 denotes a buffer memory, 75 denotes an interface unit, 76 denotes a CPU, and 77 denotes a buffer occupation counter.

The above coefficient and the side information supplied from the coding unit 23, are supplied through the interface unit 70 to the coefficient processing circuit 71. In the coefficient processing circuit 71, the coefficient and the side information are converted to a run length limited code. The run length limited code is encoded to a variable length code in the variable length coding circuit 72. In addition to the variable length coding circuit 72, a transmission frame containing the variable length codes is formed under control of the CPU 76, as explained later with reference to FIG. 10. The CPU 76 controls the formation of the transmission frame in the variable length coding circuit 72. Since bit length of an effective portion in each byte in the transmission frame is not generally equal to eight, only the effective portions in successive bytes in the transmission frame are packed in turn, in the rotation circuit 73. The packed transmission frame is once stored in the buffer memory 74, and is then output to the multiplexer 25 in the order of first-in first-out, to be multiplexed with the coded voice signal and the data signal and to be transmitted through the transmission line 8.

The degree of occupation of the above data in the buffer memory 74 is monitored by the buffer occupation counter 77, and is then supplied to the CPU 76. The information on the degree of occupation in the buffer memory 74, is transferred to the controller 20, and is used to determine the above-mentioned quantization table in the quantizer 59 and the inverse quantizer 60. Namely, when the degree of occupation in the buffer memory 74 exceeds a predetermined level, the controller 20 changes the quantization table to decrease a number of output bits of the quantizer 59.

Figure 10:
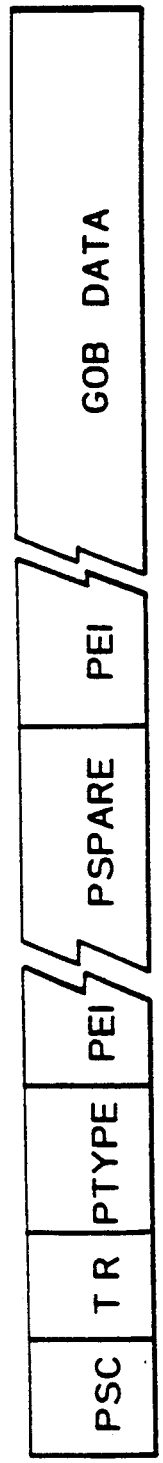
FIG. 10 is a diagram indicating a format of a transmission frame formed in the variable length coding circuit 72.

Transmission Frame Format (FIG. 10)

FIG. 10 is a diagram indicating a transmission frame format formed in the variable length coding circuit 72. The frame format of FIG. 10 is in accordance with the CCITT recommendation H. 261. Each frame for transmitting coded image data, is comprised of four layers: a frame, a group of blocks (GOB), a macro block (MB), and a block. Namely, each frame is comprised of a frame header and a plurality of groups of blocks (GOB), each group of blocks is comprised of a plurality of macro blocks (MB), and each macro block is comprised of a plurality of blocks. The frame header is comprised of a frame start code PSC, a frame number TR, type information PTYPE, information bit PEI for indicating whether or not extension data exists, and spare information PSPARE. When the bit PEI is "1", the spare information PSPARE (comprised of eight bits) follows the bit information PEI. The inventor proposes to use the area of the spare information PSPARE for transmitting the above information on channel selection. The controller 20 sends the information on channel selection to the CPU 76 in the variable length coding unit 24, and the CPU 76 controls the variable length coding circuit 72 so that the information is inserted in the area of the spare information PSPARE.

Figure 11:
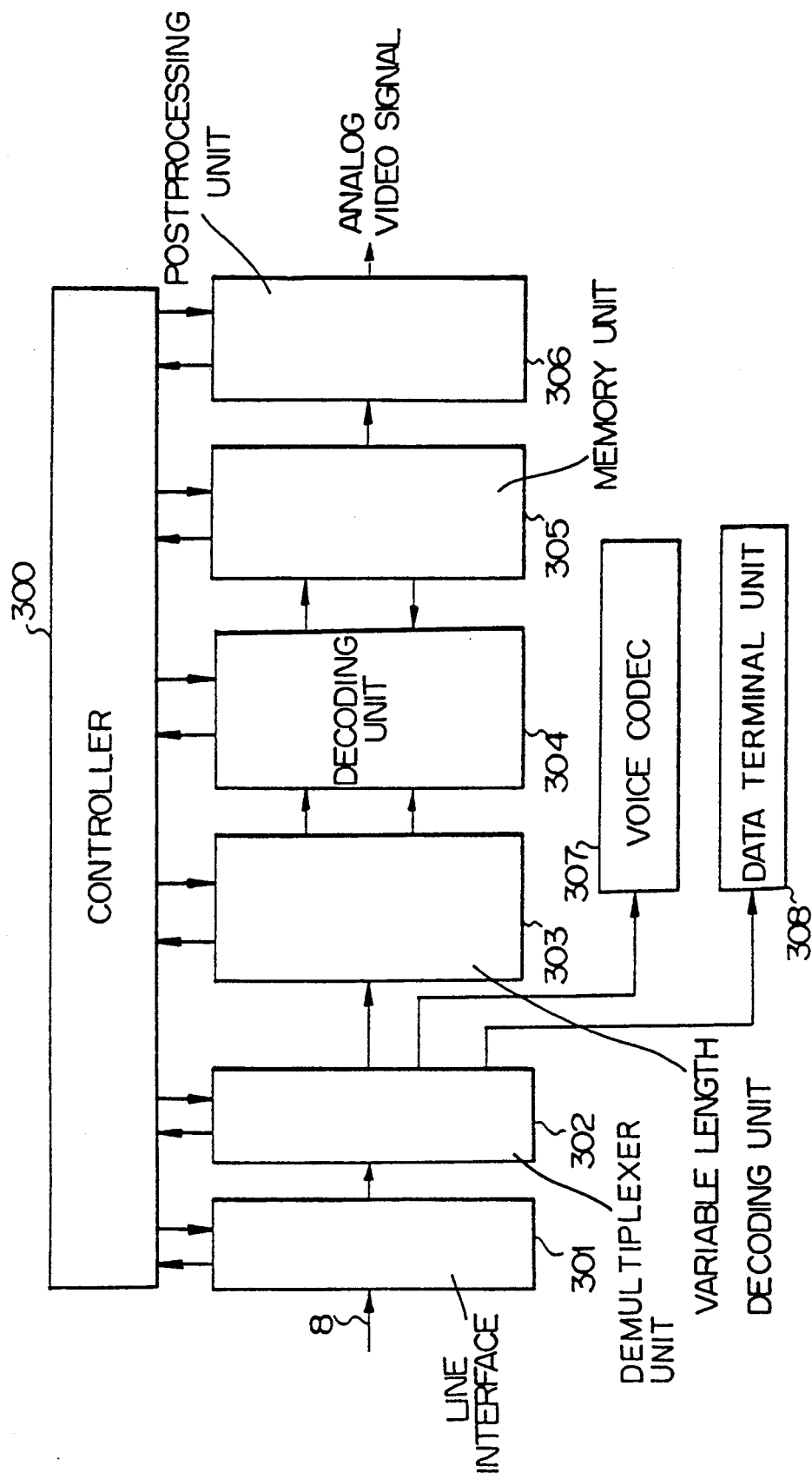
FIG. 11 is a diagram indicating a construction of the receiver side apparatus.

Receiver Side Apparatus (FIG. 11)

FIG. 11 is a diagram indicating a construction of the receiver side apparatus. In FIG. 11, reference numeral 300 denotes a controller, 301 denotes a line interface, 302 denotes a demultiplexer unit, 303 denotes a variable length decoding unit, 305 denotes a memory unit, 306 denotes a postprocessing unit, 307 denotes a voice CODEC, and 308 denotes a data terminal unit.

When the above-mentioned multiplexed signal is transmitted through the transmission line 8 to the receiver side apparatus, the multiplexed signal is received at the line interface 301, and is then demultiplexed in the demultiplexer unit 302 to the above-mentioned packed transmission frame, the coded voice signal, and the data signal. The coded voice signal is supplied to the voice CODEC 307, and the data signal is supplied to the data terminal unit 308.

In the variable length decoding unit 303, the above packed transmission frame is unpacked, and decoded from the variable length code to the coefficient and the side information. In addition, the above information on channel selection is read from the above-mentioned area of the spare information PSPARE in the transmission frame.

The coefficient and the side information are input into the decoding unit 304 to be decoded therein to the CIF signal. The memory unit 305 is used as a frame memory in the decoding operation by the decoding unit 304, and is used as a buffer memory for transferring the decoded image data (CIF) signal to the postprocessing unit 306. In the postprocessing unit 306, the analog video signal (NTSC signal) of an image to be displayed on the display unit connected to the receiver side apparatus, is generated from the CIF signal.

As explained later, image data (CIF) signals of a plurality of channels (corresponding to a plurality of television cameras) are temporarily stored in different areas in the memory unit 305, and the controller 300 in the receiver side apparatus can generate the image to be displayed, by supplying appropriate reading addresses to the memory unit 305 based on the above information on channel selection.

Figure 12:
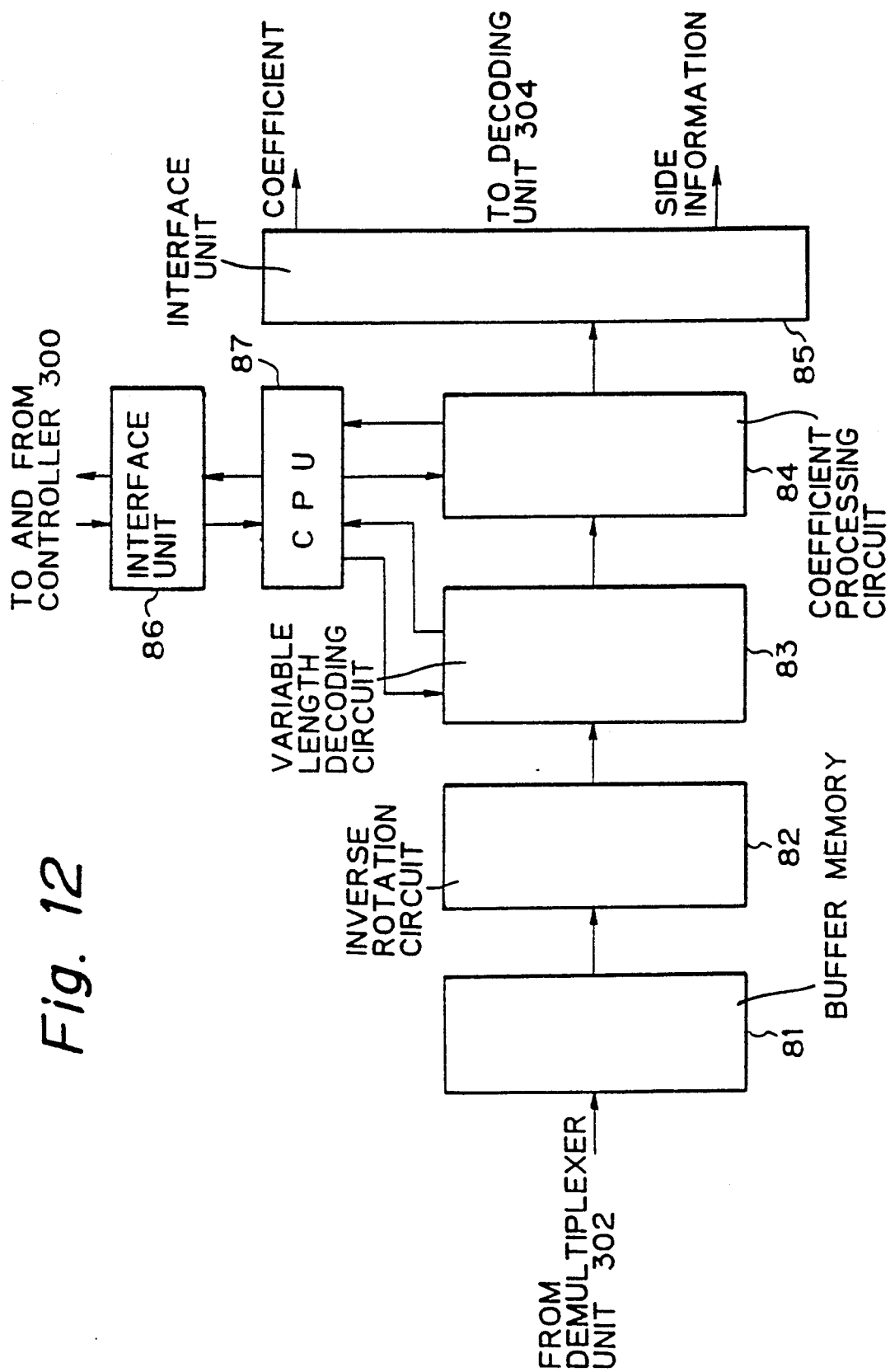
FIG. 12 is a diagram indicating another construction of the variable length decoding unit 303.

Variable Length Decoding Unit 303 (FIG. 12)

FIG. 12 is a diagram indicating another construction of the variable length decoding unit 303. In FIG. 12, reference numeral 81 denotes a buffer memory, 82 denotes an inverse rotation circuit, 83 denotes a variable length decoding circuit, 84 denotes a coefficient processing unit, 85 denotes an interface unit, 86 denotes an interface unit, and 87 denotes a CPU. The above packed transmission frame from the demultiplexer 302 is temporarily held in the buffer memory 81, and then read out therefrom in the order of first-in first-out. The transmission frame read out from the buffer memory 81 is unpacked in the inverse rotation circuit 82. Then, in the variable length decoding circuit 83, the transmission frame is decomposed and the variable length codes contained in the transmission frame are decoded into run length limited codes of the coefficients and the side information. In addition, when decomposing the transmission frame, a phase of each frame is detected by the CPU 87, and the above information on channel selection is read by the CPU 87 from the above-mentioned area of the spare information PSPARE in the transmission frame. The detected phase of frame and the information on channel selection are transferred to the controller 300 and memorized therein.

Next, the above run length limited codes are decoded into the coefficients and the side information in the coefficient processing circuit 84, and the coefficients and the side information is transferred through the interface circuit 85 to the decoding unit 304.

Figure 13:
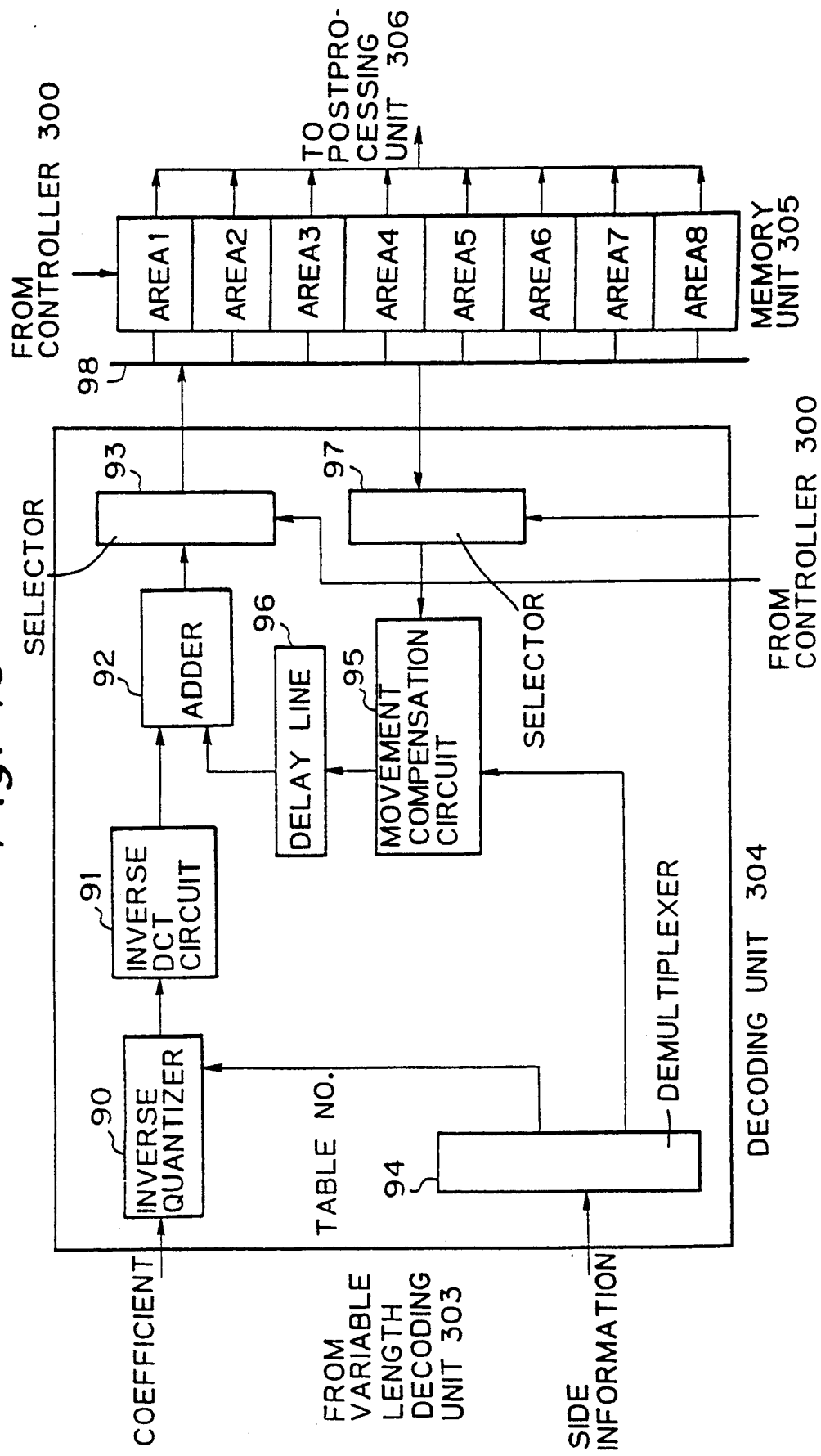
FIG. 13 is a diagram indicating constructions of the decoding unit 304 and the memory unit 305.

Decoding Unit 304 and Memory Unit 305 (FIG. 13)

FIG. 13 is a diagram indicating the construction of the decoding unit 304 and the memory unit 305. In FIG. 13, reference numeral 90 denotes an inverse quantizer, 91 denotes an inverse DCT circuit, 92 denotes an adder, 93 and 97 each denote a selector, 94 denotes a demultiplexer, 95 denotes a movement compensation circuit, 96 denotes a delay line, and 98 denotes a bus.

The memory unit 305 contains a plurality of (eight) areas, and each of the plurality of areas temporarily stores image data of a frame. Each area of the memory unit 305 has one bit data input/output port. The selector 93 has one input port and eight output ports. The eight output ports of the selector 93 are respectively connected with the data input/output ports of the eight areas of the memory unit 305 through the bus 98, so that an output of the adder 92 is supplied through the selector 93 to one of the eight areas of the memory unit 305 under control of the controller 300. The selector 97 has eight input ports and an output port. The eight input ports of the selector 97 are respectively connected with the data input/output ports of the eight areas of the memory unit 305 through the bus 98. The selector 97 is controlled by the controller 300 to supply an output of one of the areas of the memory unit 305 to the movement compensation circuit 95.

The above side information from the variable length decoding unit 303 is demultiplexed to information on the table number and the movement information in the demultiplexer 94, the information on the table number is supplied to the inverse quantizer 90 to determine the quantization table to be used, and the movement information is supplied to the movement compensation circuit 95 to modify image data read from a frame memory (the memory unit 305). The above coefficient from the variable length decoding unit 303 is first inversely quantized (interpolated) in the inverse quantizer 90, and is then decoded to interframe difference data in the inverse DCT circuit 91. The memory unit 305 is used as a frame memory of the decoding unit 304, and image data of a preceding frame is read out from one of the eight areas of the memory unit 305 through the selector 97 block by block under control of the controller 300, and is supplied to the movement compensation circuit 95 to generate the image data of the preceding frame modified by the above movement information. The modified data from the movement compensation circuit 95 is supplied to the adder 92 through the delay line 96. In the adder 92, the above interframe difference data obtained in the inverse DCT circuit 91 is added to the above modified image data to obtain a regenerated image data of each frame. The regenerated image data is transferred through the selector 93 to the memory unit 305 to be written in one of the eight areas in the memory unit 305.

The controller 300 in the receiver side apparatus controls the selectors 93 and 97 and the operation of writing the image data in the memory unit 305 by supplying control signals of the selectors 93 and 97 and an appropriate writing address signal and control signals to the memory unit 305. During the above operation, the controller 300 memorizes which frame data is stored in which area of the memory unit 305, together with information on channel selection detected from the received transmission frame in the variable length decoding unit 83. In addition, since the controller 300 has information on the phase of each frame flowing in the receiver side apparatus based on the detection of the phase of each frame in the variable length decoding unit 83, the controller 300 recognizes the timing in which the coded result of image data of each frame is output from the decoding unit 304.

Figure 14:
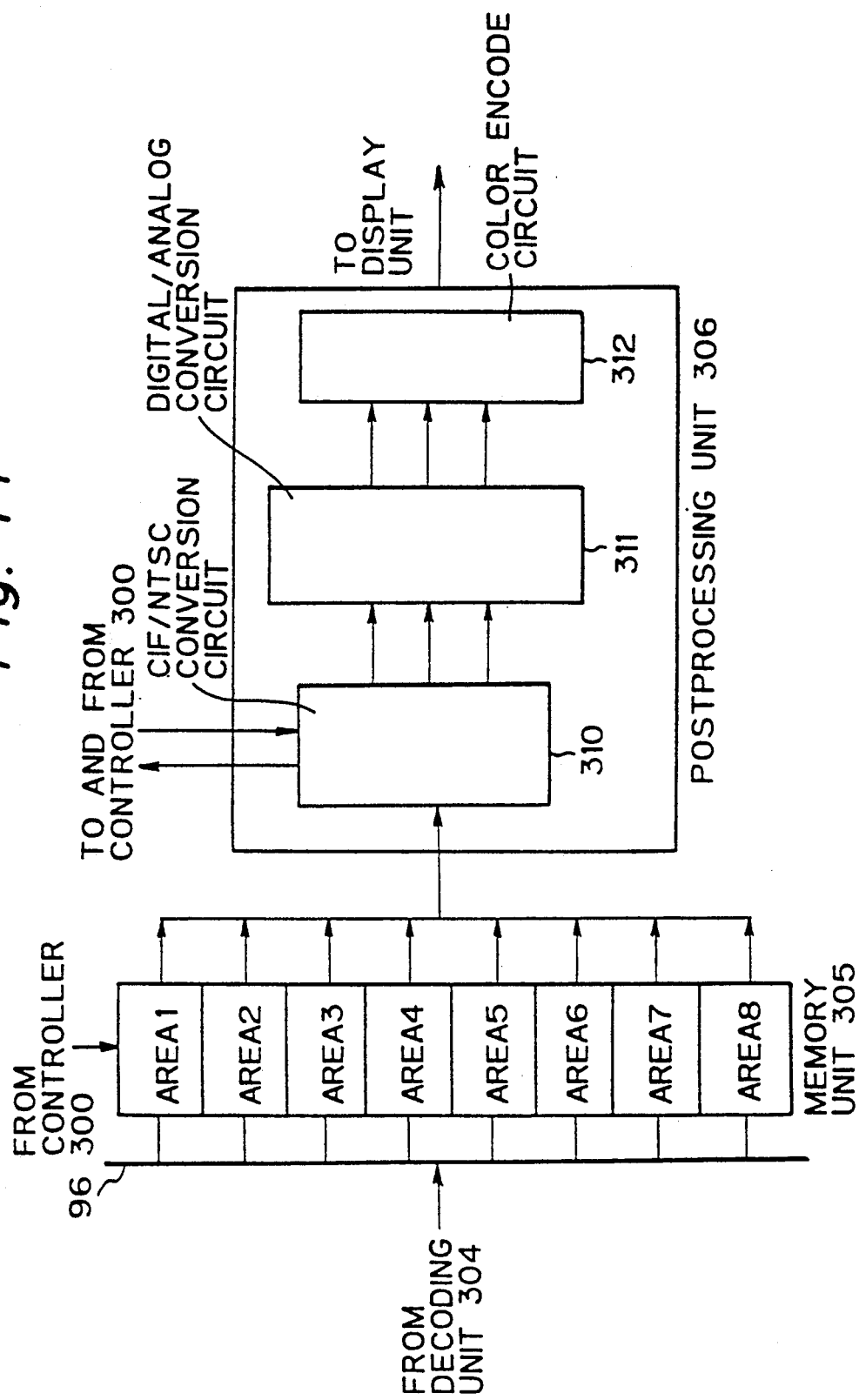
FIG. 14 is a diagram indicating constructions of the memory unit 305 and the postprocessing unit 306.

Memory Unit 305 and Postprocessing Unit 306 (FIG. 14)

FIG. 14 is a diagram indicating the construction of the memory unit 305 and the postprocessing unit 306. In FIG. 14, reference numeral 310 denotes a CIF/NTSC conversion circuit, 311 denotes a digital/analog conversion circuit, and 312 denotes a color encode circuit.

As explained before, image data (CIF) signals of a plurality of channels (from a plurality of television cameras) are temporarily stored in different areas in the memory unit 305, and the controller 300 in the receiver side apparatus supplies appropriate reading addresses to the memory unit 305 based on the above information on channel selection to generate the image to be displayed on the display unit connected to the receiver side apparatus.

The CIF/NTSC conversion circuit 310 converts the CIF signals supplied from the memory unit 305, into the digital video signals (R, G, and B signals) of the image to be displayed on the display unit.

The digital video signals (R, G, and B signals) is converted into analog R, G, and B signals in the digital/analog conversion circuit 311, and is then transformed, in the color encoder 312, into an analog NTSC signal to be supplied to the display unit.

In the above construction of the preferred embodiments of the present invention, all the units and circuits are preferably constructed by hardware logic circuits, respectively, except as follows. The controllers 20 and 300, the CPU 76 in the variable length coding unit 24, and the CPU 87 in the variable length decoding unit 303, each comprise an MPU, the operations of the controllers 20 and 300 and the CPU's 76 and 87 are being performed in accordance with programs provided respectively.

We claim:

1. A transmission system comprising:
a sender side apparatus, a receiver side apparatus, and a transmission line connecting said sender side apparatus and said receiver side apparatus;
said sender side apparatus comprising,
   selector means for receiving image data signals of a plurality of channels in parallel and frame by frame, selecting an image data signal of one of the plurality of channels for each frame, and discarding the image data signals of the other plurality of channels,
   interframe difference coding means for coding the image data signal selected for each frame by said selector means, by interframe difference coding,
   interframe difference monitoring means for monitoring data amounts of interframe differences in the image data signals of the respective channels,
   selection channel control means for determining which one of said plurality of channels is to be

TABLE 1

Relationship between Data Yield Ratio Ri, Channel Determination Index Ti, and Determined Channel

| No. of Frame | Data Yield Ratio Ri | | Channel Determination Index Ti | | Determined Channel |
|---|---|---|---|---|---|
| | Channel X | Channel Y | Channel X | Channel Y | |
| 1 | ⅓ | ⅔ | ⅓ | ⅔ | Y |
| 2 | ⅓ | ⅔ | ⅔ | ⅓ | X |
| 3 | ⅓ | ⅔ | 0 | 1 | Y |
| 4 | ⅓ | ⅔ | ⅓ | ⅔ | Y |
| 5 | ⅓ | ⅔ | ⅔ | ⅓ | X |
| 6 | ⅓ | ⅔ | 0 | 1 | Y |
| 7 | ⅓ | ⅔ | ⅓ | ⅔ | Y |
| 8 | ⅓ | ⅔ | ⅔ | ⅓ | X |
| 9 | ⅓ | ⅔ | 0 | ⅔ | Y |
| 10 | ⅓ | ⅔ | ⅓ | 1 | Y |
| 11 | ⅓ | ⅔ | ⅔ | ⅓ | X |
| 12 | ⅓ | ⅔ | 0 | ⅔ | Y |
| 13 | ⅓ | ⅔ | ⅓ | 1 | Y |
| 14 | ⅓ | ⅔ | ⅔ | ⅓ | X |
| 15 | ⅓ | ⅔ | 0 | ⅔ | Y |
| 16 | ⅓ | ⅔ | ⅓ | 1 | Y |
| 17 | ⅓ | ⅔ | ⅔ | ⅓ | X |
| 18 | ⅓ | ⅔ | 0 | ⅔ | Y |
| 19 | ⅓ | ⅔ | ⅓ | 1 | Y |
| 20 | ⅓ | ⅔ | ⅔ | ⅓ | X |

TABLE 2

Relationship between Data Yield Ratio Ri, Channel Determination Index Ti, and Determined Channel

| No. of Frame | Data Yield Ratio Ri | | | Channel Determination Index Ti | | | Determined Channel |
|---|---|---|---|---|---|---|---|
| | X | Y | Z | X | Y | Z | |
| 1 | 1/6 | ⅓ | ⅓ | 1/6 | ⅓ | ⅓ | Z |
| 2 | 1/6 | ⅓ | ⅓ | ⅓ | ⅔ | 0 | Y |
| 3 | 1/6 | ⅓ | ⅓ | ⅓ | 0 | ⅓ | X |
| 4 | 1/6 | ⅓ | ⅓ | −⅓ | ⅓ | 1 | Z |
| 5 | 1/6 | ⅓ | ⅓ | −1/6 | ⅔ | ⅓ | Y |
| 6 | 1/6 | ⅓ | ⅓ | 0 | 0 | 1 | Z |
| 7 | 1/6 | ⅓ | ⅓ | 1/6 | ⅓ | ⅓ | Z |
| 8 | 1/6 | ⅓ | ⅓ | ⅓ | ⅔ | 0 | Y |
| 9 | 1/6 | ⅓ | ⅓ | ⅓ | 0 | ⅓ | X |
| 10 | 1/6 | ⅓ | ⅓ | −⅓ | ⅓ | 1 | Z |
| 11 | 1/6 | ⅓ | ⅓ | −1/6 | ⅔ | ⅓ | Y |
| 12 | 1/6 | ⅓ | ⅓ | 0 | 0 | 1 | Z |
| 13 | 1/6 | ⅓ | ⅓ | 1/6 | ⅓ | ⅓ | Z |
| 14 | 1/6 | ⅓ | ⅓ | ⅓ | ⅔ | 0 | Y |
| 15 | 1/6 | ⅓ | ⅓ | ⅓ | 0 | ⅓ | X |
| 16 | 1/6 | ⅓ | ⅓ | −⅓ | ⅓ | 1 | Z |
| 17 | 1/6 | ⅓ | ⅓ | −1/6 | ⅔ | ⅓ | Y |
| 18 | 1/6 | ⅓ | ⅓ | 0 | 0 | 1 | Z |
| 19 | 1/6 | ⅓ | ⅓ | 1/6 | ⅓ | ⅓ | Z |
| 20 | 1/6 | ⅓ | ⅓ | ⅓ | ⅔ | 0 | Y | selected by said selector means, based on said data amounts of interframe differences in the image data signals of the respective channels, and adaptively controlling the selector means in accordance with said determination, selected channel information generating means for generating channel information indicating said one of the channels determined by said selection channel control means for each frame, and transmitting means for transmitting frame by frame the image data signal coded by said interframe difference coding means, together with said channel information corresponding to the coded image data signal; and said receiver side apparatus comprising, receiving means for receiving frame by frame said image data signal which is transmitted from said sender side apparatus, together with said channel information corresponding to the image data signal, and decoding means for decoding said image data signal received by said receiving means for each frame.

2. An image data coding apparatus comprising:

selector means for receiving image data signals of a plurality of channels parallel and frame by frame, selecting an image data signal of one of the plurality of channels for each frame, and discarding the image data signals of the other plurality of channels;

interframe difference coding means for coding the image data signal selected for each frame by said selector means, by interframe difference coding;

interframe difference monitoring means for monitoring data amounts of interframe differences in the image data signals of the respective channels;

selection channel control means for determining which one of said plurality of channels is to be selected by said selector means, based on said data amounts of interframe differences in the image data signals of the respective channels, and adaptively controlling the selector means in accordance with said determination;

selected channel information generating means for generating channel information indicating said one of the channels determined by said selection channel control means for each frame; and transmitting means for transmitting frame by frame the image data signal coded by said interframe difference coding means, together with said channel information corresponding to the coded image data signal.

3. An image data coding apparatus according to claim 2, said interframe difference monitoring means monitors data amounts of interframe differences in the image data signals of the respective channels, on an input side of said selector means.

4. An image data coding apparatus according to claim 3, said interframe difference monitoring means comprises for each of said plurality of channels, data receiving means for receiving image data signals of successive frames of said each channel from said input side of the selector means, frame memory means for storing image data signals of two successive frames most recently received, and data amount calculating mean for calculating the data amounts of interframe differences in the image data signals of the respective channels, based on the image data signals of two successive frames stored in said frame memory means.

5. An image data coding apparatus according to claim 2, said interframe difference monitoring means monitors data amounts of interframe differences in the image data signals of the respective channels, on an output side of said selector means.

6. An image data coding apparatus according to claim 5, said interframe difference monitoring means comprises, data receiving means for receiving image data signals of successive frames of the channels respectively selected by said selector means, from said output side of the selector means, and data delivering means, having a plurality of output ports corresponding to said plurality of channels, for delivering the received image data signals of the successive frames, respectively to output ports corresponding to channels said received image data signals of the successive frames belong to, and said interframe difference monitoring means further comprises for each channel, frame memory means for storing image data signals of two successive frames most recently received for said each frame, and data amount calculating means for calculating the data amount of interframe differences in the image data signals of said each channel, based on the image data signals of two successive frames stored in said frame memory means.

7. An image data coding apparatus according to claim 2, said selection channel control means comprises:

first means for initializing channel determination indexes of all of said plurality of channels at an initial stage of an operation of said image data coding apparatus, second means for collecting said data amounts of interframe differences of all of said plurality of channels from said data amount calculating means of all of said plurality of channels when said image data coding apparatus receives each frame, third means for obtaining a sum of said data amounts of interframe differences of all of said plurality of channels, fourth means for calculating a ratio of said data amounts of interframe differences of each channel and said sum, fifth means for adding said ratios of all of said plurality of channels, to corresponding channel determination indexes, respectively, sixth means for searching the largest channel determination index, seventh means for determining one of said plurality of channels corresponding to said largest channel determination index, as said channel to be selected by said selector means, and an eighth means for subtracting one from the channel determination index of the channel determined by said seventh means.

8. An image data coding apparatus according to claim 2, said selection channel control means comprises:

first means for collecting said data amounts of interframe differences of all of said plurality of channels from said data amount calculating means of all of said plurality of channels, second means for obtaining a sum of said data amounts of interframe differences of all of said plurality of channels, third means for calculating a ratio of said data amounts of interframe differences of each channel and said sum, fourth means for memorizing a plurality of predetermined patterns each of which determines channels to be selected by said selector means in a predetermined number of successive frame cycles, corresponding to distributions of said ratios over said plurality of channels, fifth means for determining one of said plurality of patterns, corresponding to the distribution of said ratios of all of the plurality of channels, as a pattern to be used for determining channels to be selected by said selector means in the predetermined number of following successive frame cycles, and sixth means for driving said first to fifth means for each n successive frame cycles of the operation of said image data coding apparatus where n is said predetermined number.

9. An image data coding apparatus according to claim 8, said selection channel control means further comprises for each channel:

difference holding means for temporarily holding the data amount of said each channel obtained by said data amount calculating means, difference-of-difference obtaining means for obtaining a difference between two most recently obtained successive data amounts of said each channel, and pattern changing means for driving said first to fifth means to change the pattern to be used for determining channels to be selected by said selector means, to a pattern newly determined by said first to fifth means when said difference exceeds a predetermined value.

10. An image data coding apparatus according to claim 1, further comprising memory means, provided between said selector means and said coding means, and containing a plurality of areas, for storing the image data output from the selector means, in one of the areas thereof, and memory writing control means for controlling said memory means so that the image data output from the selector means is written in one of the areas of said memory means not used at the moment.

11. An image data coding apparatus according to claim 10, wherein said coding means uses one of said plurality of areas of said memory means as a frame memory for temporarily holding an image data signal of a preceding frame used as a subtrahend in obtaining an interframe difference in the interframe difference coding, and memory reading/writing control means for controlling said memory means so that the image data signal output from said selector means and then stored in one of the plurality of areas of the memory means, is read to supply the image data signal to the interframe difference coding means as a minuend in obtaining an interframe difference in the interframe difference coding, and said image data signal of a preceding frame is written in and read from one of said plurality of areas of said memory means.

12. An image data coding apparatus according to claim 1, further comprising selection channel memorizing means for memorizing the channel determined to be selected by said selector means, by said selection channel control means.

13. An image data coding apparatus according to claim 12, further comprising transmission frame generating means, provided in a following stage of said interframe difference coding means, for generating a transmission frame which contains said image data signal of each frame coded by said interframe difference coding means, and said channel information corresponding to the coded image data signal.

14. An image data decoding apparatus, comprising:

receiving means for receiving frame by frame an image data signal and channel information, the image data signal having been coded by interframe difference coding and the channel information indicating which one of a plurality of channels the image data signal contains frames, and decoding means for interframe difference decoding said image data signal received by said receiving means to associate each frame with a channel indicated by the channel information.

15. An image data decoding apparatus according to claim 14, further comprising memory means, containing a plurality of areas, for holding the decoded image data signal of each frame in one of said areas, and storing area memorizing means for memorizing the area in which the decoded image data signal of each frame is stored.

16. An image data decoding apparatus according to claim 15, further comprising:

display means for displaying an image, display image data reading means for selectively reading the image data signal held in the plurality of areas of said memory means, and display image generating means for receiving the image data signals read by the display image data reading means, and generating an image data signal to form an image to be displayed on said display means.

17. An image data decoding apparatus according to claim 15, wherein said decoding means uses one of said plurality of areas of said memory means as a frame memory for temporarily holding an image data signal of a preceding frame used as an addend for obtaining the decoded image data by adding the addend to the image data signal coded by the interframe difference coding, and memory reading/writing control means for controlling said memory means so that the image data signal output from said decoding means is written in one of the plurality of areas of said memory means and so that the image data signal of the preceding frame is read from one of the plurality of areas of said memory means to be used as the addend.

* * * * *